Patented Feb. 16, 1932

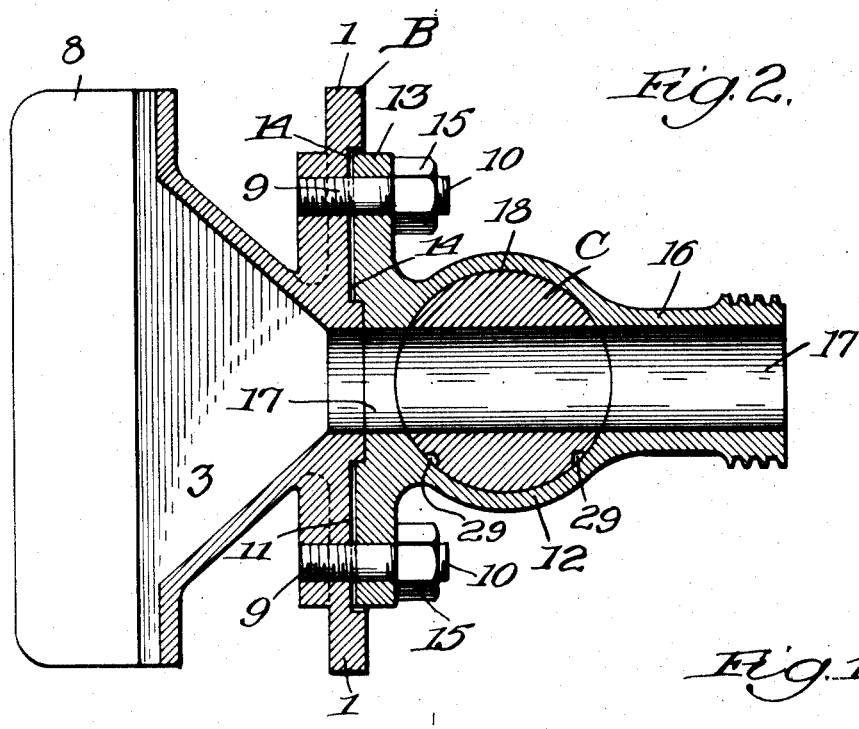
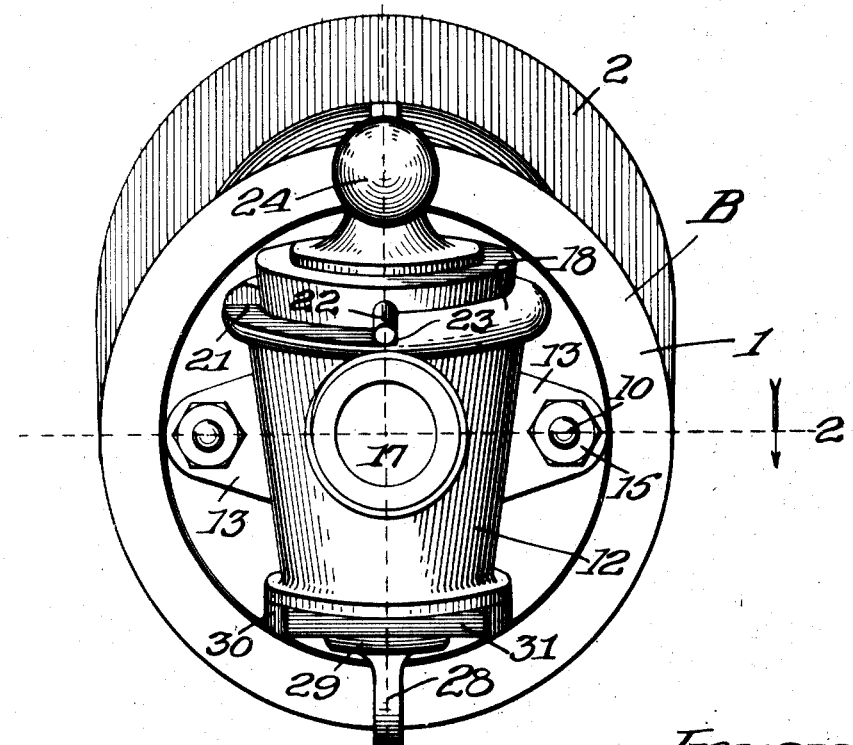

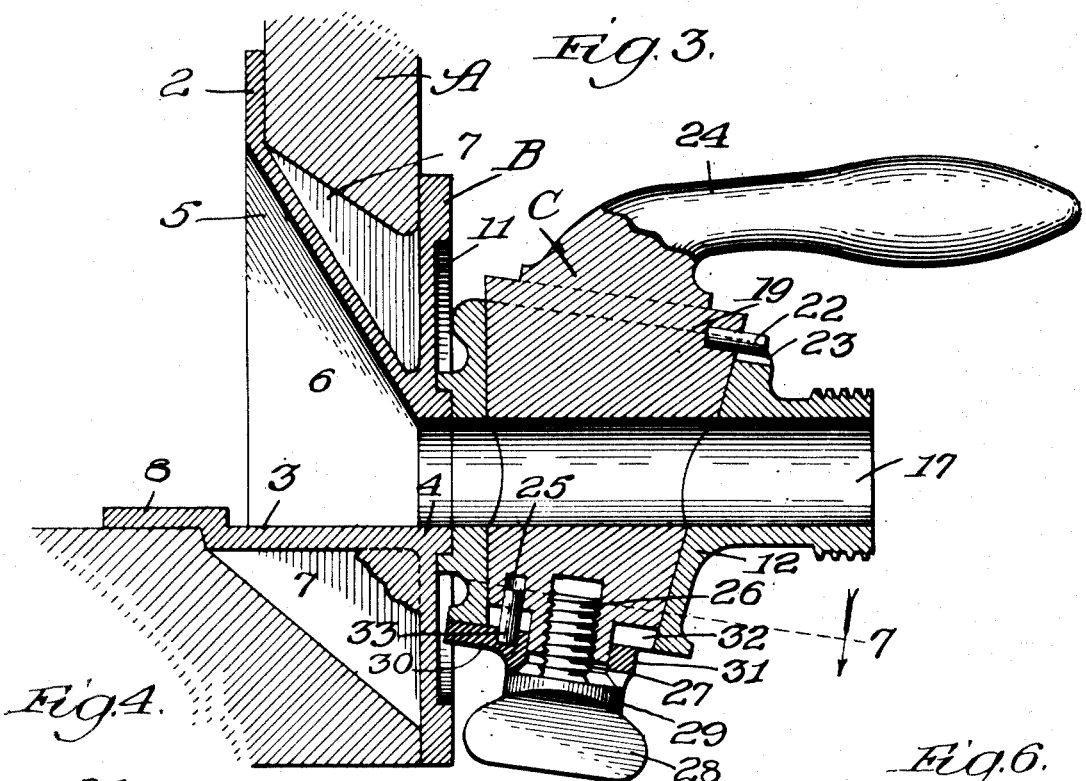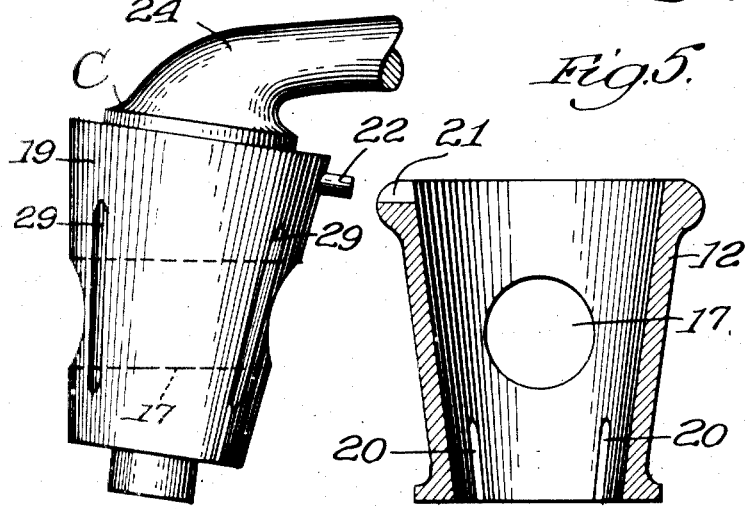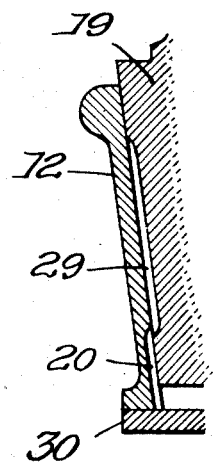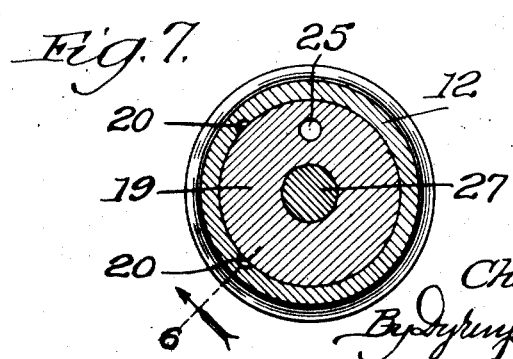

1,845,736

UNITED STATES PATENT OFFICE

CHARLES M. ANDERSON, OF KENOSHA, WISCONSIN

LEAK-DETECTOR VALVE AND ATTACHING FITTING

Application filed August 19, 1929. Serial No. 387,043.

This invention relates to leak-detector valves and attachment fittings therefor, and is particularly adapted to be employed in connection with sanitary vats equipped with insulating walls.

One of the primary objects of the invention is to provide an attachment fitting which may be easily applied to an insulated tank or vat and which is so shaped as to permit circulation of the liquid within the tank and fitting up to the point of discharge. Another object of the invention is to provide a valve and attachment means which enable the valve to be supported in close relation to the liquid within the tank so that the distance which the liquids travel in passing from the tank to the valve is very slight. A further object of the invention is to provide means whereby the circulation of the liquid in the tank will extend to the liquid embraced within the walls of the vat at the point of discharge, the circulation being the natural circulatory current of the liquid in the vat during the holding period and while the valve is closed.

Another object is to provide a flange fitting which enables a valve to be supported adjacent the wall of the vat and means within the valve for preventing the escape of liquid into the outlet passage beyond the valve. A further object of the invention is to provide a valve with grooves extending part-way along the sides of the valve plug and corresponding grooves extending part-way on the inner sides of the valve casing, whereby the grooves of the plug and casing may be brought into alinement, when the valve is turned so as to form one continuous drain passage which will prevent the escape of liquid around the valve plug. Other objects and advantages will appear as the specification proceeds.

The invention is fully described in the following specification, and shown in the accompanying drawings, in which:—

Figure 1 is a view in elevation of a valve and flange attachment embodying my invention.

Fig. 2 is a sectional plan view, the section being taken as indicated at line 2 of Fig. 1.

Fig. 3 is a vertical sectional view, the section being taken as indicated at line 3 of Fig. 1.

Fig. 4 is a view in elevation of the valve plug removed from the valve casing.

Fig. 5 is a vertical sectional view of the valve casing.

Fig. 6 is a broken sectional view, the section being taken as indicated at line 6, of Fig. 7, and Fig. 7 is a plan sectional view, the section being taken as indicated at line 7 of Fig. 3.

In the illustration given, A represents the wall of a vat, B an attachment fitting having flanges embracing the walls of the vat, and C represents a leak-detector valve supported upon attachment fitting B and in close relation thereto.

In the illustration given, the walls A are of the thick insulated type which are commonly employed in sanitary milk vats. A portion of the wall is removed to enable attachment fitting B to be secured in position.

The attachment fitting B is shown provided with an outer flange 1 and an inner flange 2 and connected to outer flange 1 at an intermediate point, a horizontal flange 3 which preferably is somewhat fan-shaped. Flange 1 is centrally apertured to provide an outlet or throat 4. Connecting flange 2 to flanges 1 and 3 is a somewhat funnel-shaped wall 5 having its side inclined inwardly toward outlet opening or throat 4. By these means a large open-mouthed discharge opening 6 is provided which has its side walls converging toward the throat 4. Bracing the wall 5 and flanges 2 and 3 are web supports 7 which are preferably cast integrally with the flanges 1, 2 and 3. The bottom flange 3 is preferably equipped with a stepped-up forward flange portion 8. Rigidly secured to flange 1 are bolts 9 which have threaded ends 10 extending forwardly for a purpose hereinafter described. The rear flange or disk 1 is also preferably provided with a recessed annular portion 11.

The leak-detector or plug valve C is provided with a casing 12 which is equipped with lateral flanges 13. Flanges 13 have an annular projecting portion 14 which is received within the annular recess 11 to form therewith a seal. The flanges 13 are apertured to receive bolts 10 and are secured thereon rigidly by means of nuts 15. Valve casing 12 is provided with a tubular outlet extension 16 which is preferably exteriorly threaded for connection to other pipes. A passage 17 extends through the valve casing 12, valve plug 19, when in open position, and extension 16. The valve casing 12 is provided centrally with a conical seat 18 which is adapted to receive the valve plug 19. The inner walls or seat 18 of the valve are preferably provided with grooves 20 which extend from the lower end of the valve a short distance upwards. As shown, more clearly in Figs. 2 and 5, a portion of the upper rim 21 of the valve casing is cut away on one side so as to enable a pin 22, with which the valve plug 19 is equipped to move from one point of the casing to a point diametrically opposite. The uncut-away portion of the rim provides stops 23 which prevent the complete circumferential travel of pin 22.

Valve plug 18 is equipped with an operating handle 24 which may be secured to the plug in any suitable manner. The body of the valve is conical in shape so as to fit within seat 18, and is provided with a central flow passage. At its lower side, valve plug 19 is provided with a tubular recess 25 and is preferably provided centrally with a threaded opening 26, adapted to receive screw 27. Screw 27 is preferably provided with a wing-handle or thumb-key 28 which is provided with an inner annular flange. Grooves 29 are formed on the outer surface of plug 19 and preferably extend along the central portion of the plug.

A circular disk 30 is secured between the flange of the key 28 and the lower portion of the valve-casing 12. A portion of the disk is cut away, at 31, to permit liquid in the recess 32 at the lower portion of the casing to escape. The disk 30 is recessed to receive a pin 33 which may be secured fast within the recess in any suitable manner.

In assembling the parts of the apparatus, the fitting B is first secured in position within walls A. In order to permit the insertion of fitting B, a portion of the vertical wall near the bottom of the vat is cut away at an angle, through which opening the forward portion of the fitting may be inserted so that the vertical wall is embraced between flanges 1 and 2, and so that the horizontal flange 3 rests upon the bottom wall of the vat. The flanges 13 of the valve-casing 12 are then secured to the flange 1 of the fitting B by means of bolts 10 and nut 15, the extension or projecting portion 14 being received within the recess 11 of the flange 1 so as to form a seal. Valve plug 19 is placed within valve-casing 18 and the pin 33 of disk 30 is received within the recess 25 of plug 19. The screw 27 of thumb-key 28 is then screwed into threaded recess 26 of plug 19 so as to secure the plate 30 against the lower end of the valve-casing 12.

In the operation of the valve, the grooves 20 of valve-casing 12 and the grooves 29 of valve-plug 19 are so disposed that when the valve is turned to closed position the grooves are alined on each side of the valve opening and serve to form a continuous drain passage through which any liquid escaping by the opening of the valve-casing and around the plug will be drained to compartment 32 in the lower portion of the valve-casing. When the valve is in open position, the grooves are, in the illustration shown, not in alinement. If desired, however, grooves may be caused to coincide to form a continuous drip passage, when the valve is in open position. The operator is able to determine when the valve is in closed position or in open position by the contact of pin 22 with stops 23.

In the preferred construction, disk 30 has the portion 31 cut away at such a point that the disk will cover the outlet grooves 20, when the valve is in closed position. It will be observed that the pin 33 connects the valve-plug 19 and the disk 30 so as to cause the two parts to move together. The liquid collecting within the compartment 32 may escape through the outlet provided by cutting away the portion 31 of the disk 30.

With the parts assembled, as shown in the drawings, it will be observed that the valve-casing is brought substantially flush with the wall of the vat and that the discharge-opening with which the valve is connected is very short and has connecting side walls flaring rearwardly so as to permit circulation of the liquid within the vat up to the very point of discharge. With a discharge opening tapering in horizontal and vertical section, as shown in the drawings, the circulatory current of the milk during the holding period and while the valve is closed will extend substantially through the discharge opening. By this construction, dead ends, i. e., zones in which comparatively little circulation can take place, are substantially eliminated. Furthermore, growth of bacteria in the passage beyond the valve is prevented by drain grooves 20 and 29 which carry away any milk or other liquid escaping past the opening of valve-plug 19.

It will be observed that the passage-way 17, which extends through the valve, is not perpendicular to the vertical axis of valve-plug 19, but extends on an angle or diagonal therethrough. This enables the inclined wall of the conical valve to be brought into alinement or flush with the outer wall of the vat, i. e., substantially at right angles to the discharge opening, while at the same time the passage-way 17 is brought into horizontal alinement with the discharge opening. Thus a continuous horizontal discharge passage is secured without having formed an intervening idle pocket in the line to which circulation would not extend.

The valve and fitting construction are particularly adapted for use with sanitary vats which are employed for pasteurization of milk, and in which circulation of the milk is desired in every possible part of the vat and discharge apparatus.

It will be observed that many changes can be made without departing from the spirit of the invention. For example, the walls of the vat may be shaped somewhat like flange 5 and thus permit dispensing with some of the inner flanges of the fitting B.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a device of the character set forth, a sanitary vat having a discharge-opening and the wall of said vat cut away near said discharge-opening so as to provide a discharge-passage through said wall having an enlarged mouth and tapering in horizontal and vertical section toward said discharge-opening, an outlet pipe connected with said discharge-opening, and means associated with said pipe for controlling the flow of liquid therethrough.

2. In a device of the character set forth, a sanitary vat provided with a discharge-opening and having a somewhat funnel-shaped passage through its wall near said opening, said passage having a mouth flared in horizontal section and a valve supported adjacent said opening and controlling the flow of liquid from said opening.

3. In a device of the character set forth, a sanitary vat provided with a discharge-opening, a fitting equipped with flanges engaging the wall of said vat and having sides inclined in a horizontal plane toward the discharge-opening, an outlet pipe connected to said discharge-opening, and means on said outlet pipe for controlling the flow of liquid therethrough.

4. In a device of the character set forth, a sanitary vat provided with a discharge-opening, a fitting provided with flanges engaging the wall of said vat, a passageway between flanges of said fitting having an enlarged mouth and sides converging in a horizontal plane toward said discharge-opening, a discharge-pipe associated with said discharge-opening, and means thereon for controlling the flow of liquid therethrough.

5. In a device of the character set forth, a sanitary vat having an outlet, a fitting equipped with flanges adapted to engage the wall of said vat and having a passageway with sides inclined in a horizontal plane toward said discharge-opening, a valve having a passage alined with said outlet, and means for securing said valve adjacent said outlet.

6. In a device of the character set forth, a sanitary vat provided with a discharge-opening and having its wall cut away near said opening to provide a tapering passage, and a conical plug-valve supported substantially flush against said wall and having an inclined passage therethrough, said passage being in horizontal alinement with said discharge opening.

In witness whereof, I have hereunto set my hand this 1st day of August, 1929.

CHARLES M. ANDERSON.